United States Patent
Shi et al.

(10) Patent No.: US 12,425,935 B2
(45) Date of Patent: Sep. 23, 2025

(54) METHOD AND APPARATUS FOR DATA TRANSMISSION

(71) Applicant: Lenovo (Beijing) Ltd., Beijing (CN)

(72) Inventors: Jie Shi, Haidian District (CN); Lianhai Wu, Chaoyang (CN); Haiming Wang, Xicheng District (CN); Jing Han, Chaoyang District (CN); Ran Yue, Haidian District (CN); Jie Hu, Changping District (CN)

(73) Assignee: Lenovo (Beijing) Ltd., Beijing (CN)

( * ) Notice: Subject to any disclaimer, the term of this patent is extended or adjusted under 35 U.S.C. 154(b) by 508 days.

(21) Appl. No.: 17/911,269

(22) PCT Filed: Mar. 30, 2020

(86) PCT No.: PCT/CN2020/082101
§ 371 (c)(1),
(2) Date: Sep. 13, 2022

(87) PCT Pub. No.: WO2021/195843
PCT Pub. Date: Oct. 7, 2021

(65) Prior Publication Data
US 2023/0108725 A1    Apr. 6, 2023

(51) Int. Cl.
*H04W 36/00* (2009.01)
(52) U.S. Cl.
CPC .............. *H04W 36/0064* (2023.05)
(58) Field of Classification Search
None
See application file for complete search history.

(56) References Cited

U.S. PATENT DOCUMENTS 10,419,980 B2 * 9/2019 Lee .................. H04L 12/4633
12,245,310 B2 * 3/2025 Kim .................. H04W 76/30
(Continued)

FOREIGN PATENT DOCUMENTS

WO    2019242030 A1    12/2019

OTHER PUBLICATIONS

Interdigital Communications, Son , "On Small Data transmission without Path Switch (R3-190039/S2-", BGPP TSG-RAN WG3 #103, R3-190367, Athens, Greece [retrieved Oct. 25, 2022]. Retrieved from the Internet <https://www.3gpp.org/ftp/tsg_ran/WG3_lu/TSGR3_103/Docs>., Mar. 2019, 8 Pages.
(Continued)

*Primary Examiner* — Faiyazkhan Ghafoerkhan
(74) *Attorney, Agent, or Firm* — FIG. 1 Patents (57) ABSTRACT

Embodiments of the present application relate to a method and apparatus for data transmission. An exemplary method includes: receiving a data transmission request from a first base station, in a second base station, wherein the data transmission request indicates data transmission information on a data transmission; determining whether to transmit the data transmission by the second base station or make an anchor relocation for the data transmission based on the data transmission information and assistant information associated with the data transmission; and transmitting a data transmission response to the first base station based on the determining.

20 Claims, 7 Drawing Sheets

(56) References Cited

U.S. PATENT DOCUMENTS

| | | | | |
|---|---|---|---|---|
| 2009/0207810 A1* | 8/2009 | Petrovic | ............... | H04W 36/02 |
| | | | | 370/331 |
| 2012/0225656 A1* | 9/2012 | Persson | ............ | H04W 36/0016 |
| | | | | 455/436 |
| 2018/0324652 A1* | 11/2018 | Ryu | ...................... | H04W 36/08 |
| 2018/0332462 A1* | 11/2018 | Kim | ..................... | H04W 28/02 |
| 2019/0028337 A1* | 1/2019 | Ryu | ........................ | H04W 8/02 |
| 2019/0159077 A1* | 5/2019 | Ryu | ........................ | H04W 8/04 |
| 2019/0297121 A1* | 9/2019 | Qiao | .................. | H04L 65/1016 |
| 2023/0083985 A1* | 3/2023 | Kim | ..................... | H04W 76/20 |
| | | | | 370/329 |
| 2023/0084062 A1* | 3/2023 | Shah | ................ | H04W 74/0833 |
| | | | | 370/329 |
| 2023/0108725 A1* | 4/2023 | Shi | ................... | H04W 36/0064 |
| | | | | 370/331 |

OTHER PUBLICATIONS

PCT/CN2020/082101, "International Preliminary Report on Patentability", PCT Application No. PCT/CN2020/082101, Oct. 13, 2022, 6 pages.

PCT/CN2020/082101, "International Search Report and Written Opinion", PCT Application No. PCT/CN2020/082101, Jan. 6, 2021, 8 pages.

ZTE, "Consideration on the impact of NW slicing on RAN", 3GPP TSG-RAN WG2 Meeting #97, R2-1701387, Athens, Greece [retrieved Oct. 25, 2022]. Retrieved from the Internet <https://www.3gpp.org/ftp/tsg_ran/wg2_rl2/TSGR2_97/Docs/>., Feb. 2017, 6 Pages.

* cited by examiner

METHOD AND APPARATUS FOR DATA TRANSMISSION

TECHNICAL FIELD

Embodiments of the present application generally relate to wireless communications, and more particularly, to data transmission in wireless communications.

BACKGROUND

Wireless communication networks have grown rapidly over the years. The next generation wireless communication system 5G is an example of an emerging telecommunication standard. New radio (NR) is generally a set of enhancements to the long term evolution (LTE) mobile standard promulgated by the 3rd generation partnership project (3GPP). 5G and/or new radio (NR) networks are expected to increase throughput, coverage, and robustness and reduce latency and operational and capital expenditures.

With the development of the 5G system, various aspects need to be studied to perfect the 5G/NR technology.

SUMMARY

One aspect of the present application provides a method, wherein the method includes: receiving a data transmission request from a first base station, in a second base station, wherein the data transmission request indicates data transmission information on a data transmission; determining whether to transmit the data transmission by the second base station or make an anchor relocation for the data transmission based on the data transmission information and assistant information associated with the data transmission; and transmitting a data transmission response to the first base station based on the determining.

Another aspect of the present application provides a method, wherein the method includes: receiving uplink data, in a first base station; transmitting, by the first base station, a data transmission request for a data transmission associated with the received uplink data to a second base station; and receiving a data transmission response indicating that the uplink data will be transmitted by the second base station or an anchor relocation for transmitting the uplink data will be made.

Yet another aspect of the present application provides a method, wherein the method includes: reporting assistant information on a data transmission associated with uplink data from a user equipment to one of a core network and a base station on a random access channel (RACH) message. The random access channel (RACH) message can be Msg.A or Msg.3 in a random access (RA) procedure.

Yet another aspect of the present application provides a method, wherein the method includes: obtaining assistant information associated with a data transmission, and transmitting the assistant information to a base station.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems. Moreover, the terminologies recited in the present application may change, which should not affect the principle of the present application.

Figure 1:
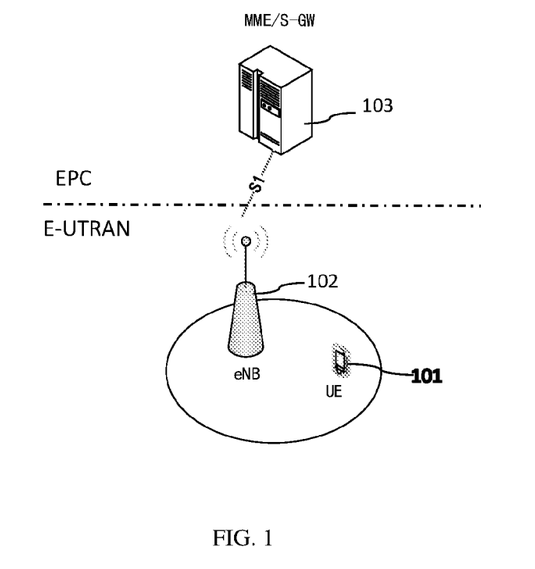
FIG. 1 illustrates a schematic diagram of an exemplary LTE system architecture.

FIG. 1 illustrates a schematic diagram of an exemplary LTE system architecture according to an embodiment of the present application. The LTE system includes at least one user equipment (UE) 101, an evolved-UMTS terrestrial radio access network (E-UTRAN), and an evolved packet core (EPC).

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

The E-UTRAN includes one or more evolved node-B (eNB) 102, and a plurality of UEs may be located in one cell. The eNB 102 is generally a fixed station that communicates with the UE 101 and may be referred to as another terminology, such as a base station (BS), a base transceiver system (BTS), an access point, etc. One eNB 102 may be deployed per cell. There are one or more cells within the coverage of the eNB 102. A cell may provide downlink or uplink transmission services to several UEs. A downlink (DL) denotes communication from the eNB 102 to the UE 101, and an uplink (UL) denotes communication from the UE 101 to the eNB 102. In the DL, a transmitter may be a part of the eNB 102, and a receiver may be a part of the UE 101. In the UL, the transmitter may be a part of the UE 101, and the receiver may be a part of the eNB 102.

The EPC includes a mobility management entity (MME) which is in charge of control plane functions, and a serving gateway (S-GW) which is in charge of user plane functions. The MME/S-GW 103 may be positioned at the end of the network and connected to an external network. The MME has UE access information or UE capability information, and such information may be primarily used in UE mobility management. The S-GW is a gateway of which an endpoint is an E-UTRAN. The MME/S-GW 103 provides an end point of a session and mobility management function for the UE 101.

Interfaces for transmitting user traffic or control traffic may be used. The UE 101 and the eNB 102 are connected by a Uu interface. The eNBs 102 are interconnected by an X2 interface. Neighboring eNB s may have a meshed network structure that has the X2 interface. The eNBs 102 are connected to the EPC by an S1 interface. The eNBs 102 are connected to the MME by means of an S1-MME interface, and are connected to the S-GW by S1-U interface. The S1 interface supports a many-to-many relation between the eNB 102 and the MME/S-GW.

In the LTE system architecture, two radio resource control (RRC) states, i.e., RRC idle (an idle state) and RRC connected (a connected state), are defined for UE(s). When a UE needs to perform a service, the UE needs to set up an RRC connection to a network, switching from the idle state to the connected state, before performing service data transmission. However, during the UE switching from the idle state to the connected state, relatively high signaling overheads are generated. Thus, the switching time is excessively long, which leads to an excessively high transmission delay.

Figure 2:
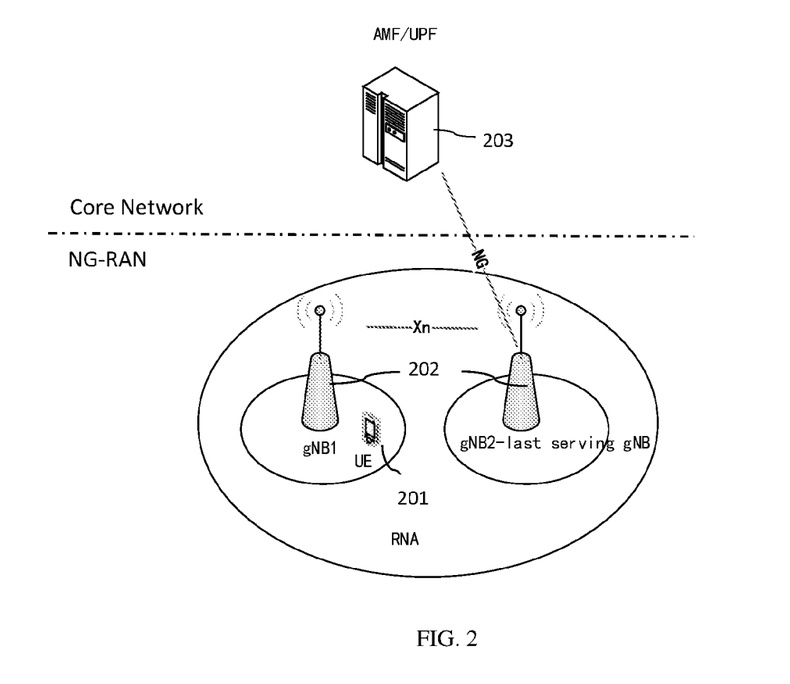
FIG. 2 illustrates a schematic diagram of an exemplary 5G system architecture.

FIG. 2 illustrates a schematic diagram of an exemplary 5G system architecture according to an embodiment of the present application. The exemplary 5G system architecture includes at least one UE 201, a next generation-radio access network (NG-RAN), and a next generation core network (CN).

The NG-RAN may include at least one gNB 202, and at least one UEs 201 present in each cell. The gNB 202 provides the UE 201 with end points of the control plane and the user plane. The gNB 202 is generally a fixed station that communicates with the UE 201 and may be referred to as another terminology, such as a base station (BS), a base transceiver system (BTS), an access point, or the like. A gNB 202 may be arranged in every cell. At least one cell may be present in the coverage of the gNB 202.

The CN may include an access and mobility function (AMF) and a session management function (SMF) 203, which are responsible for a function of a control plane. The AMF may be responsible for a mobility management function, and the SMF may be responsible for a session management function. The CN may include a user plane function (UPF) which is responsible for a function of a user plane.

Interfaces for transmitting user traffic or control traffic may be used. The UE 201 and the gNB 202 may be connected by a Uu interface. Neighboring gNBs 202 may have a meshed network structure based on an Xn interface. A gNBs 202 may be connected to the CN by an NG interface. Specifically, a gNBs 202 may be connected to an AMF by an NG-C interface, and may be connected to a UPF by an NG-U interface. The NG interface supports a many-to-many-relation between the gNB 202 and the AMF/UPF 203.

In a 5G system, RRC_INACTIVE state (RRC inactive state) has been introduced in addition to the existing RRC_CONNETED state and RRC_IDLE state in an LTE system. RRC_INACTIVE state is a state where a UE remains in CM-CONNECTED and can move within an area configured by NG-RAN without notifying NG-RAN. In RRC_INACTIVE state, the last serving gNB node keeps the UE context and the UE-associated NG connection with the serving AMF and UPF. A similarity between the RRC_IDLE state and RRC_INACTIVE state is that a UE cannot perform data transmission in either the RRC_IDLE state or the RRC_INACTIVE state, and if the UE needs to transmit data, the UE needs to switch from the RRC_IDLE state or the RRC_INACTIVE state to the RRC_CONNECTED state. A difference between the RRC_IDLE state and the RRC_INACTIVE state is that the time consumed by the UE for switching from the RRC_INACTIVE state to the RRC_CONNECTED state is less than that for switching from the RRC_IDLE state to the RRC_CONNECTED state. Interaction signaling used for switching from the RRC_INACTIVE state to the RRC_CONNECTED state is smaller than that for switching from the RRC_IDLE state to the RRC_CONNECTED state, that is, signaling overhead greatly reduces.

Due to a UE being mobile, it may move among different RANs, which may trigger a RAN update procedure. Various RAN procedures are illustrated in the following embodiments.

Figure 3:
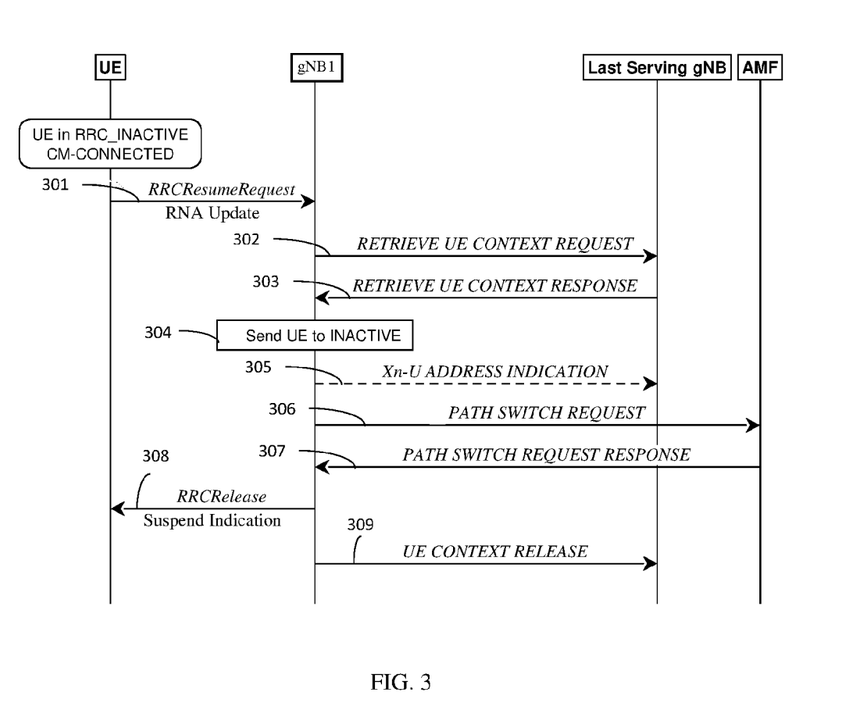
FIG. 3 illustrates an exemplary RNA update procedure.

FIG. 3 illustrates an exemplary RNA update procedure according to some embodiments of the present application. The exemplary RAN procedure may be triggered when the UE moves out of the configured RNA, or be triggered periodically. In the RNA update procedure, context retrieval over Xn interface may be involved, and anchor relocation for the UE may be performed under certain circumstances.

As shown in FIG. 3, the UE in RRC_INACTIVE and CM-CONNECTED state can transmit a RRC resume request to a gNB (gNB 1 for clarity, hereafter the same) in step 301. gNB1 may not be the last serving gNB because the UE is mobile. The UE resumes from RRC_INACTIVE state, providing I-RNTI allocated by the last serving gNB of the UE and appropriate cause value, e.g., RAN notification area update. In step 302, in the case that the gNB is able to resolve the gNB identity contained in the I-RNTI, it will request the last serving gNB to provide UE context, providing the cause value received in step 301 by transmitting a UE context request. The last serving gNB may provide the UE context (as assumed in the following) by transmitting a UE context response. Alternatively, the last serving gNB may decide to move the UE to RRC_IDLE state. In some other embodiments of the present application, the last serving gNB may decide whether the UE is still within the previously configured RNA. When the UE is still within the previously configured RNA, the UE context is kept in the last serving gNB and the UE is still in RRC_INACTIVE state.

Accordingly, gNB1 may receive a UE context response from the last serving gNB in step 303. In step 304, gNB1 may switch (or send, hereafter the same) the UE to RRC_CONNECTED state, or switch the UE back to RRC_IDLE state (wherein, an RRCRelease message is sent by gNB1), or switch the UE back to RRC_INACTIVE state. In some embodiments of the present application, when loss of DL user data buffered in the last serving gNB is prevented, gNB1 will provide forwarding addresses, e.g., Xn-U address indication to the last serving gNB in step 305. gNB1 may perform a path switch, which includes transmitting a path switch request to the last serving gNB in step 306 and receiving a patch switch request response in step 307. gNB1 may keep the UE in RRC_INACTIVE state by sending an RRCRelease message with a suspend indication in step 308, and trigger the release of the UE resources at the last serving gNB by transmitting a UE context release message to the last serving gNB in step 309.

Figure 4:
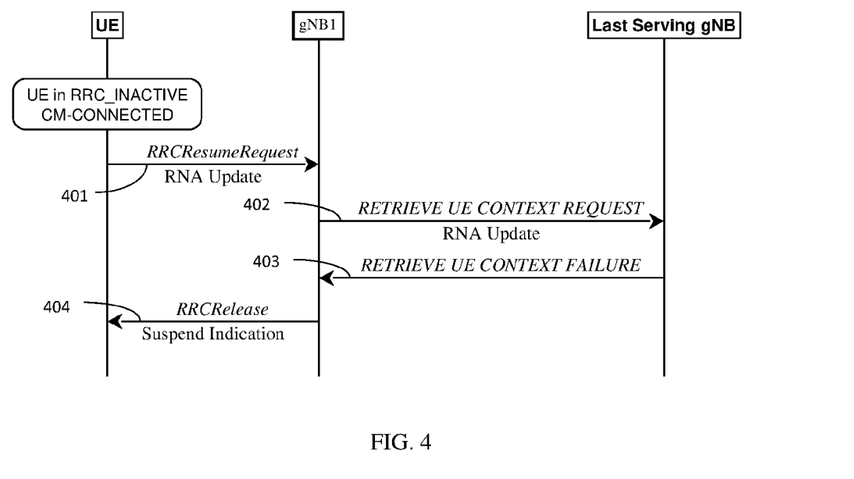
FIG. 4 illustrates another exemplary RNA update procedure.

FIG. 4 illustrates another exemplary RNA update procedure according to some embodiments of the present application.

As shown in FIG. 4, in step 401, a UE in the RRC_INACTIVE and CM-CONNECTED state can transmit a RRC resume request to a gNB (gNB1 for clarity). The UE resumes from a RRC_INACTIVE state, providing the I-RNTI allocated by the last serving gNB of the UE and appropriate cause value, e.g., RAN notification area update. In step 402, when gNB1 is able to resolve the gNB identity contained in the I-RNTI, it will request the last serving gNB to provide UE Context, providing the cause value received in step 401. That is, gNB1 will transmit a retrieve UE context request in step 402. The last serving gNB stores received information to be used in the next resume attempt (e.g. C-RNTI and PCI related to the resumption cell), and responds to gNB1 with the RETRIEVE UE CONTEXT FAILURE message including an encapsulated RRCRelease message in step 403. After receiving the RRCRelease message, gNB1 may forward the RRCRelease message with a suspend indication to the UE in step 404.

Figure 5:
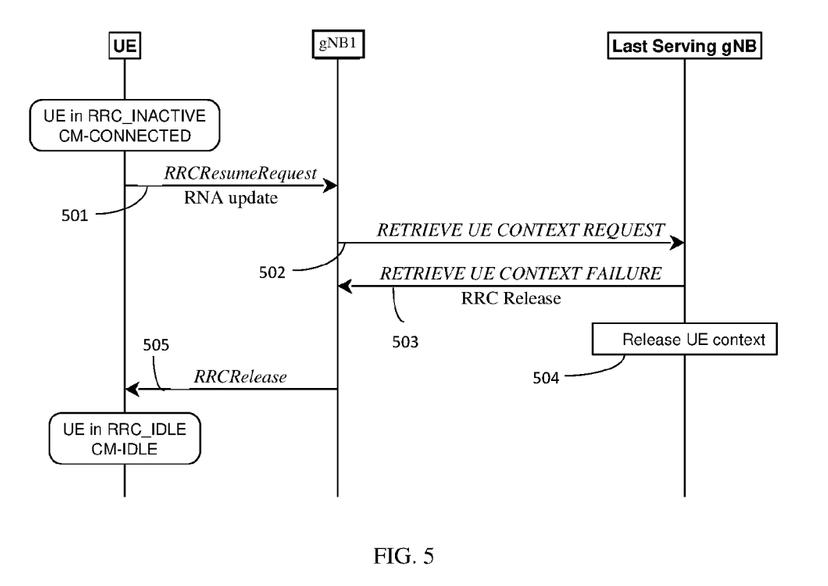
FIG. 5 illustrates yet another exemplary RNA update procedure.

FIG. 5 illustrates yet another exemplary RNA update procedure according to some embodiments of the present application. The RNA update procedure may be triggered when the last serving gNB decides to move (or send) the UE to the RRC_IDLE state.

As shown in FIG. 5, a UE in RRC_INACTIVE and CM-CONNECTED state can transmit a RRC resume request to a gNB (gNB1 for clarity). The UE resume from RRC_INACTIVE state by transmitting an RRC resume request in step 501, providing the I-RNTI allocated by the last serving gNB and appropriate cause value, e.g., RAN notification area update.

In step 502, when gNB1 is able to resolve the gNB identity contained in the I-RNTI, it requests the last serving gNB to provide UE Context by transmitting a retrieve UE context request, providing the cause value received in step 501. The UE may not have the UE context either or may be overload etc. Instead of providing the UE context, the last serving gNB may transmit an RRC release message in step 503 to indicate releasing the UE and moving the UE to RRC_IDLE state, such as a RETRIEVE UE CONTEXT FAILURE message etc. In step 504, the last serving gNB deletes the UE context if any. After receiving the RRC release message, gNB1 may send the RRC release message to the UE in step 505, which may trigger the UE to move to RRC_IDLE state.

In addition, based on RP-193252 for small data transmission, context fetch and data forwarding in RRC_INACTIVE state will be discussed. According to some embodiments of the present disclosure, a UE in the inactive mode may initiate a small data transmission procedure. For example, the UE may transmit UL small data to gNB1. Due to the UE being mobile, gNB1 may not the last serving gNB of the UE. Thus, gNB1 may request the last serving gNB to transmit the small data. gNB1 can obtain UE ID information in Msg.A, Msg.3, or other predefined messages. gNB1 may transfer the UE-ID and UE security information to the last serving gNB of the UE. In response to gNB1's request, the last serving gNB may determine whether to transmit the UL small data. In the case that the last serving gNB determines not transmit the UL small data, it may determine whether to make an anchor relocation for the small data transmission.

In addition to making anchor relocation, embodiments of the present application further propose technical solutions to support data transmission via the last serving gNB.

Figure 6:
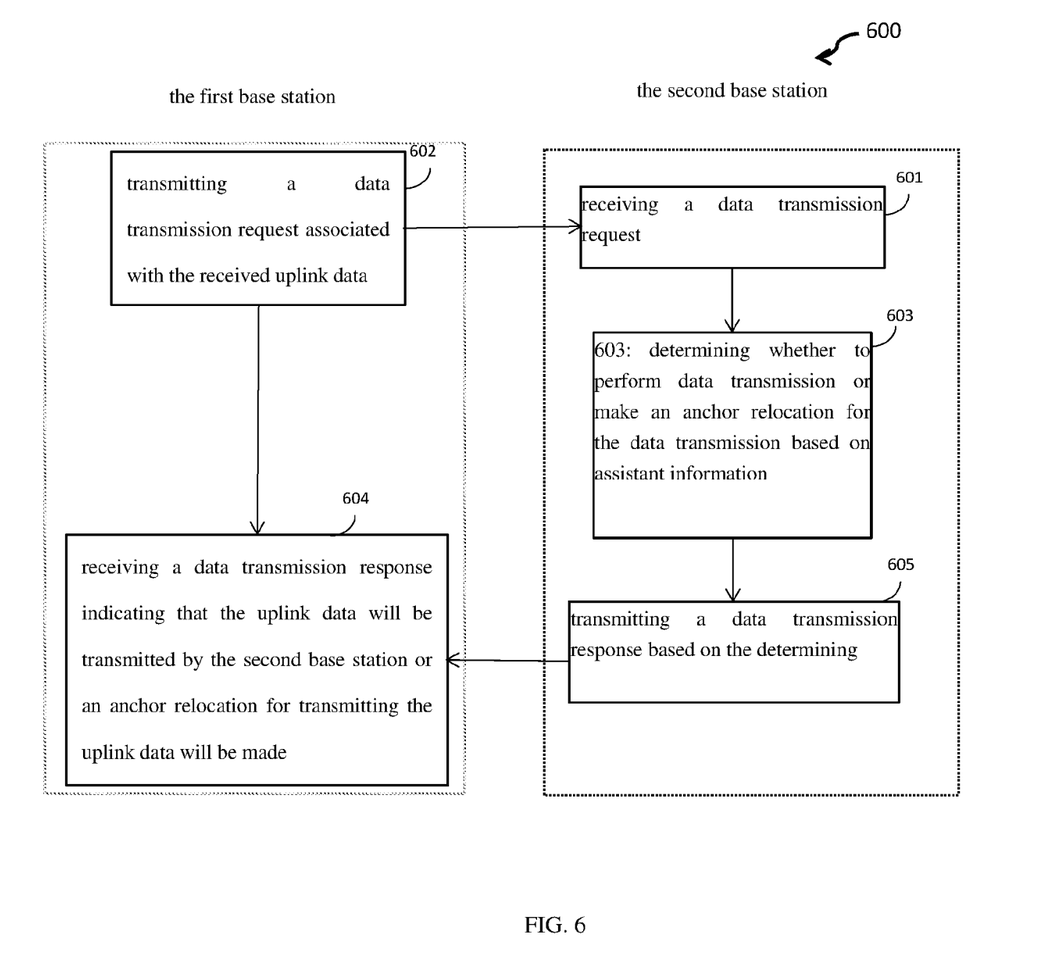
FIG. 6 illustrates a flow chart of a method for data transmission in accordance with some embodiments of the present application.

FIG. 6 illustrates a flow chart of a method for data transmission in accordance with some embodiments of the present application, which can be used for the small data transmission procedure initiated by a UE in RRC_INACTIVE state.

As shown in FIG. 6, a first base station, e.g., gNB1, may receive uplink data from a UE in operation 600. The UE may be in RRC_INACTIVE state. The first base station may transmit a data transmission request associated with the received uplink data to a second base station, e.g., the last serving gNB of the UE, in operation 602.

In operation 601, the second base station may receive the data transmission request from the first base station. The data transmission request indicates data transmission information on a data transmission, e.g., the data transmission associated with UL data to be transmitted by the UE in RRC_INACTIVE state.

According to some embodiments of the present application, the data transmission request may include an Xn-C message or a retrieve user equipment context request message. In some embodiment of the present application, the data transmission request may include at least one of UE identifier, UE security information and uplink data forwarding request information. In some other embodiment of the present application, the data transmission request may include downlink data forwarding transport network layer (TNL) address information.

In operation 603, the second base station may determine whether to transmit the data transmission by the second base station or make an anchor relocation for the data transmission based on the data transmission information and assistant information associated with the data transmission.

Generally, according to some embodiments of the present application, the second base station, e.g., the last serving gNB, may make the following three options based on data transmission information and assistant information according to some embodiments of the present application:

Option 1: UL small data will be transmitted by the last serving gNB, and no anchor relocation will be made;

Option 2: the last serving gNB will not transmit the UL small data due to overload etc.; and the last serving gNB may make a decision to do anchor relocation, and may transfer the AMF and UPF information on this UE to gNB1 due to overload etc.; and Option 3: the last serving gNB will not transmit the UL small data due to missing UE context etc.; and the last serving gNB may make a decision not to do anchor relocation, and no AMF and UPF information on this UE will be sent to gNB1 due to missing UE context.

For option 1, there is no existing message could be used to perform this function and some embodiments of the present application propose messages. For example, in some embodiments of the present application, a request message, such as an Xn message request/response or enhanced retrieve UE context request message is proposed to initiate the small data transmission. This request message may include the information of UE-ID information, UE security information and the new following IE information as in HANDOVER REQUEST message. The new IE is associated with a protocol data unit (PDU) session. In addition, the request message may also include UL data forwarding request indication to indicate small data transmission and DL forwarding up TNL Information to a dedicated data radio bearer (DRB)-ID. The UL data forwarding request indication may be associated with at least one of a PUD session and a quality of service (QoS) flow, or be associated with at least one of a PUD session, a QOS flow, and a DRB. The DL forwarding up TNL Information may be optional in some embodiments. The optional DL forwarding up TNL Information could be associated to at least one of a PUD session and a QoS flow, or be associated to at least one of a PUD session, a QOS flow, and a DRB. Furthermore, the UE needs to indicate the last serving base station that DL data response is needed or not in Msg.3, physical random access channel (PRACH) messageB, or PUR message. The UE could report release assistant information (RAI) in RACH messageB. Details will be illustrated in the following text.

For option 2, the retrieve UE context request/response may be used to perform this function. Some embodiments of the present application propose some enhancements applied to this message, such as new response cause value. These will be illustrated in detail in the following text. A retrieve UE context request message is used to indicate the last serving base station that UE have information to be transmitted with the network. The last serving base station will retrieve the UE context based on the UE ID information and security information from UE context request message, give UPF and AMF information to the first base station, and then the first base station will establish a session to the CN and make the UE in a connected mode. The DL data may be forwarded to the first base station by an Xn address indication message.

For option 3, a retrieve UE context request failure may be used to perform this function. Some embodiments of the present application propose some enhancement applied to small data transmission, such as the new failure cause value. These will be illustrated in detail in the following text.

Before the second base station makes a decision on whether to transmit the data transmission and/or whether to make anchor relocation, it has to collect efficient assistant information to make such a decision. According to some embodiments of the present application, the assistant information may include at least one of the following: first assistant information in the second base station, and second assistant information from the first base station. In some embodiments, the first assistant information in the second base station is got from a CN node, e.g., an AMF or from the UE requesting the data transmission.

According to some embodiments of the present application, the first assistant information may include at least one of the following: time information for an uplink data transmission procedure, number information of transmission block for uplink data transmission and associated transmission block (TB) size information, one or more shot of uplink data transmission, uplink data size in a time period, uplink data transmission with or without downlink data transmission, whether to support small data transmission, anchor relocation information, and release assistant information. The time information for the uplink data transmission procedure may include a time range or an averaged time duration for the uplink data transmission procedure. The number information of transmission block may include a number range of transmission block or an averaged number of transmission block. Also, the first assistant information may include the resource information applied for data transmission. The resource information could be associated to one of the Msg.B resource, the Msg.3 resource, and the configured grant type1 resources. The configured grant type1 resources are for small data transmission in UL for INACTIVE state.

The release assistant information (RAI) may correspond to Non-Access Stratum (NAS) Release Assistance Indication. RAI may have the following codepoint (index) and value (as shown in Table 1) in some embodiment of the present application. The NAS RAI may include the information that one or more UL transmissions are expected. The number of UL transmission may be a limited number of UL transmission. The one or more UL transmissions are performed based on the preconfigured UL grant or UL resource. NAS RAI may include the information that one or more DL transmissions are expected in some other embodiment of the present application. The number of DL transmission may be a limited number of DL transmission.

TABLE 1

| Codepoint/Index | Value |
| --- | --- |
| 00 | No RAI information |
| 01 | No subsequent DL and UL data transmission is expected |
| 10 | A single subsequent DL transmission is expected |
| 11 | Reserved |

Traffic information may include at least one of the traffic period information, traffic timing information, logical channel identity information, and the message size. The traffic period information may be the estimated data arrival periodicity in a sidelink (SL) or UL logical channel. The traffic timing information is the estimated timing for a packet arrival in a SL/UL logical channel. Specifically, the value indicates the timing offset with respect to subframe #0 of (SFN) #0 in milliseconds. The message size may indicate the maximum transmission block (TB) size based on the observed traffic pattern. Traffic information may indicate the data transmission is non-periodic.

In some embodiments of the present application, when the first assistant information is got from an AMF, the first assistant information may be obtained by at least one of: computed by the AMF, or transmitted from at least one base station to the AMF, or transferred from the UE to another AMF. The at least one base station may include the first base station, the second base station and/or other base station that has the associated information of the UE. The UE may transmit the first assistant information to an AMF by an Attach procedure or a tracking area update (TAU) procedure. In some embodiments of the present application, the first assistant information may be collected by an AMF from UEs, for example, over a NAS procedure. The first assistant information may be stored as UE context in the AMF. The stored UE context in the AMF, i.e. the first assistant information, may be transferred to the second base station, e.g., the last serving base station at the initial UE context setup procedure.

In some embodiments of the present application, when the first assistant information is got from UE(s), the first assistant information may be transmitted to the second base station, e.g., the last serving base station by a UE at the time when the UE had UL data transmission(s) with the second base station last time. The first assistant information may be transmitted on a random access channel (RACH) message.

In some embodiments of the present application, the second assistant information may include information indicating small data transmission procedure or information indicating anchor relocation. The information indicating small data transmission procedure may include at least one of the following: small data information, user equipment service type information for small data transmission, a service type for small data transmission, significant bit to indicate requirement of the small data transmission, and release assistant information. The information indicating anchor relocation may include at least one of the following: one bit indicating whether the first base station requests the anchor relocation, or attitude of the first base station to the anchor relocation, and uplink data information. Also, the second assistant information may include the resource information applied for data transmission. The resource information can be associated with one of Msg.B resource, Msg.3 resource, and configured grant type-1 resources. The configured grant type-1 resources are for small data transmission in UL for INACTIVE state.

In some embodiments of the present application, the attitude of the first base station to the anchor relocation may include the anchor relocation being acceptable or unacceptable for the first base station. The uplink data information may include at least one of the following: small data information, user equipment service type information and traffic information, small data size information during a timer, and UE mobility information. The small data information may include at least one of limited time for the data transmission and a data size for the data transmission. The small data information may include the data information. The data information may be the real data that will be transmitted to 5GC network. The traffic information may include at least one of period and duration of the traffic. The UE mobility information indicates the UE mobility status. For example, the mobility is high, low or normal. In the case that the UE mobility information indicates that the UE mobility is high, an anchor relocation for the data transmission may not be made. The reason is that, in the case that a UE always moves from one cell or base station, e.g., an eNB to another cell or base station, e.g., an eNB; the anchor cell or eNB will be changed frequently when the anchor relocation is performed. That will lead to extra overhead over Xn interface and NG interface. Instead, in the case that the UE mobility information indicates that the UE mobility is low, an anchor relocation for the data transmission will be made.

In some embodiments of the present application, service type may be associated with at least one of UE application layer ID, UE quality of service (QoS) flow ID information, UE bearer ID information or UE logical channel ID information, or UE logical channel group ID information. The UE bearer information may be DRB information. The UE bearer information may be SRB information.

The release assistant information may correspond to Access Stratum Release Assistance Indication (AS RAI). The release assistant information may have the following codepoint (index) and value (as shown in Table 2). AS RAI may include the information that one or more UL transmissions are expected. The number of UL transmission may be a limited number of UL transmission in some embodiments of the present application. The one or more UL transmissions are performed based on the preconfigured UL grant or UL resource. AS RAI may include the information that one or more DL transmissions are expected. The number of DL transmission may be a limited number of DL transmission.

TABLE 2

| Codepoint/Index | Value |
| --- | --- |
| 00 | No RAI information |
| 01 | No subsequent DL and UL data transmission is expected |
| 10 | A single subsequent DL transmission is expected |
| 11 | Reserved |

Traffic information may include at least one of the traffic period information, traffic timing information, logical channel identity information, and the message size. The traffic period information can be the estimated data arrival periodicity in a SL or UL logical channel. The traffic timing information is the estimated timing for a packet arrival in a SL/UL logical channel. Specifically, the value indicates the timing offset with respect to subframe #0 of SFN #0 in milliseconds. The message size may indicate the maximum TB size based on the observed traffic pattern. Traffic information may indicate the data transmission is non-periodic.

In some embodiments of the present application, the second assistant information may be transmitted to a second base station, e.g., the last serving base station along with the data transmission request, or be transmitted in a different message instead of the data transmission request.

In operation 605, the second base station may transmit a data transmission response to the first base station based on the determining. Accordingly, in step 604, the first base station may receive a data transmission response indicating that the uplink data will be transmitted by the second base station or an anchor relocation for transmitting the uplink data will be made.

According to some embodiments of the present application, the data transmission response may include an Xn-C message or retrieve UE context response message. In some embodiments of the present application, the data transmission response may include uplink data forwarding TNL address information. In some other embodiments of the present application, the data transmission response may include downlink data transfer indication information. In some yet other embodiments of the present application, the data transmission response may include at least one of following: user equipment service type, time for small data transmission, downlink data arriving (which can be multiple and or indicate the downlink data size), high load and user equipment mobility. The high load indicates that the second base station is overload.

In some embodiments of the present application, the data transmission response may indicate making an anchor relocation or rejecting small data transmission based on the service type not supporting small data transmission. In some other embodiments of the present application, the data transmission response may indicate not making an anchor relocation or accepting data transmission based on the service type supporting small data transmission. The data transmission response may indicate not to make an anchor relocation in the case that the user equipment mobility indicates that a user equipment moves in a high speed.

In some embodiments of the present application, the second base station may determine to make an anchor relocation in the case of the time for small data transmission being a long time or multiple shots. In some other embodiments of the present application, the second base station may determine to make an anchor relocation in case of the multiple downlink data arriving.

In some embodiments, the second base station may send an anchor relocation request message to the first base station. This anchor relocation request message from the second base station may include the AMF or UPF information of the UE. This anchor relocation request message may include a cause value. The cause value may indicate that the time for small data transmission is over a threshold or the second based station is overload. The second base station may receive an anchor relocation response message from the first base station. The anchor relocation response message may include the acknowledge information or reject information. The anchor relocation response message may include the UE context release indication.

In some embodiments of the present application, the first base station base station may determine to make an anchor relocation in the case of the time for small data transmission being a long time or multiple shots. In some other embodiments of the present application, the first base station may determine to make an anchor relocation in case of UE mobility being low.

The first base station may also send an anchor relocation request message to the second base station. This anchor relocation request message from first base station may include the UE ID information. The anchor relocation request may also include the cause value for an anchor relocation request. The cause value may indicate that the UE is mobile, the UE mobility, or the UE is leaving the first base station or its serving cell. The cause value may be the time for small data transmission is over a threshold. The second base station may receive the anchor relocation request message from the first base station. An anchor relocation response message may be transmitted from the second base station to the first base station. The anchor relocation response message may include the acknowledge information or reject information in response to the anchor relocation request message. The anchor relocation response message from the second base station may include the AMF or UPF information of the UE.

The following embodiments will illustrate some exemplary methods for data transmission in various scenarios of option 1, option 2 and option 3 involving information or messages, which can be based on the embodiments shown in FIG. 6.

Figure 7:
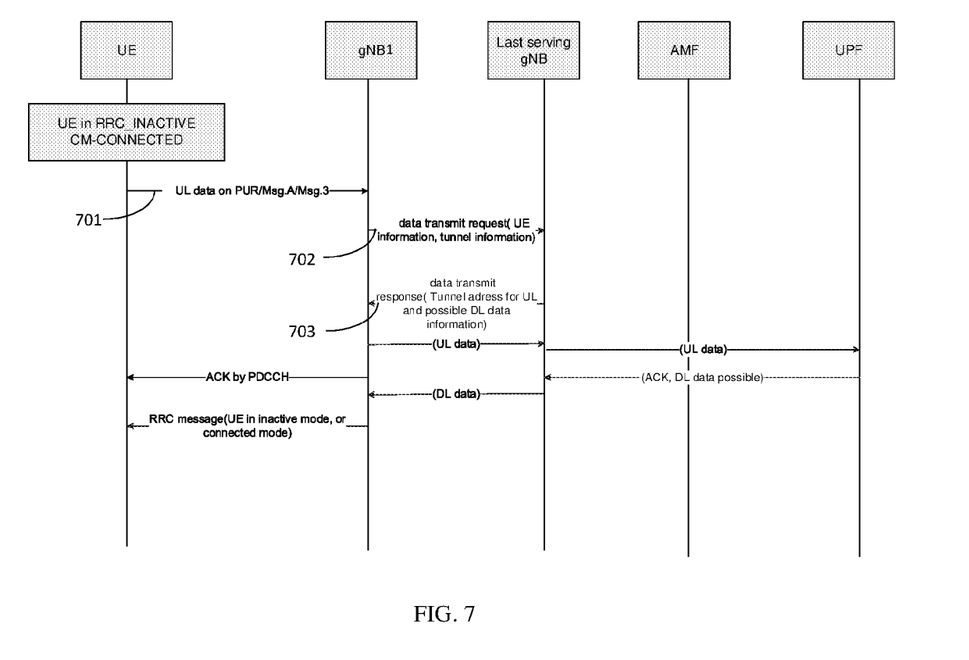
FIG. 7 illustrates an exemplary procedure of a method for data transmission in a scenario of option 1 in accordance with some other embodiments of the present application.

FIG. 7 illustrates an exemplary procedure of a method for data transmission in a scenario of option 1 according to some embodiments of the present application. As shown in FIG. 7, in step 701, UE will initiate small data transmission procedure by sending UL data on Msg.A, Msg.3 or other predefined messages (PUR/Msg.A/Msg.3). In step 702, the first base station, gNB, transmits a data transmit request, which may include adaptive information or message as illustrated above, e.g., messages as shown in Table 3 (wherein "M" means "Mobile" and "O" means "Originating") to the second base station, e.g., the last serving gNB. For example, the data transmit request may include UE information and tunnel information. The last serving gNB may makes a decision to agree on small data forwarding, and transmit a data transmission response to the first base station based on the determining, e.g., a data transmit response in step 703, which may include UL data forwarding TNL address information, and UE context/security confirmation message. In some embodiments of the present application, the data transmission response to the first base station based on the determining may also include DL data transfer indication information. Details on these messages can be the same or similar to the above illustrated. For example, UL data forwarding TNL address information may be associated with at least one of a PUD session and a QOS flow, or be associated with at least one of a PUD session, a QOS flow, and a DRB. The optional DL data transfer indication information may be associated with at least one of a PUD session and a QOS flow, or be associated to at least one of a PUD session, a QOS flow, and a DRB.

TABLE 3

| IE/Group Name | Presence | Range | IE type and reference | Semantics description |
|---|---|---|---|---|
| QoS Flows To Be Forwarded List | | 1 | | |
| >QoS Flows To Be Forwarded Item | | 1 ... <maxnoofQoSFlows> | | |
| >>QoS Flow Identifier | M | | 9.2.3.10 | |
| >>UL Forwarding | O -> M | | 9.2.3.90 | |
| Source DRB to QoS Flow Mapping List | O | | DRB to QoS Flow Mapping List 9.2.1.15 | |
| >Data Forwarding Request DRB Item | | 1 ... <maxnoofDRBs> | | |
| >>DRB ID | M | | 9.2.3.33 | |
| >>DL Forwarding UP TNL Information | O | | UP Transport Layer Information 9.2.3.30 | |

Figure 8:
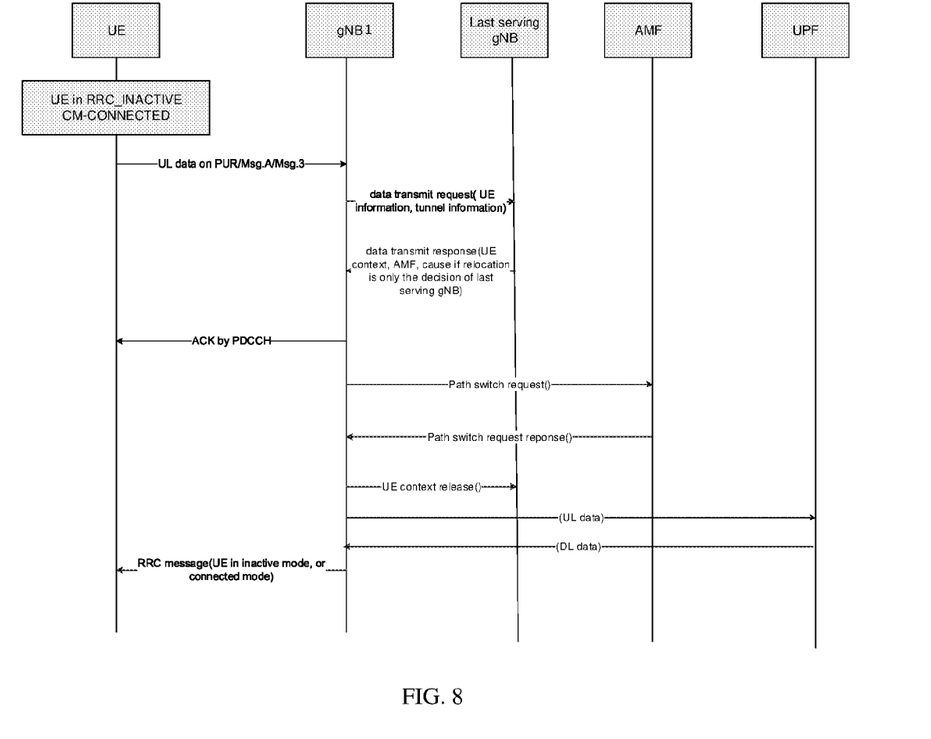
FIG. 8 illustrates an exemplary procedure of a method for data transmission in a scenario of option 2 in accordance with some yet other embodiments of the present application.

FIG. 8 illustrates an exemplary procedure of a method for data transmission in a scenario of option 2 according to some embodiments of the present application, wherein the second base station, e.g., the last serving gNB does agree on small data forwarding, but agrees the anchor gNB relocation.

in some embodiments of the present application, the data transmission response to the first base station based on the determining may include the PDU session information, but not include data forwarding TNL address information (as shown in Table 4, wherein "M" means "Mobile" and "O" means "Originating").

TABLE 4

| IE/Group Name | Presence | Range | IE type and reference | Semantics description |
|---|---|---|---|---|
| >Data Forwarding Response DRB Item | | 1 ... <maxnoofDRBs> | | |
| >>DRB ID | M | | 9.2.3.33 | |
| >>UL Forwarding UP TNL Information | O | | UP Transport Layer Information 9.2.3.30 | |
| >QoS Flows To Be Forwarded Item | | 1 ... <maxnoofQoSFlows> | | |
| >>QoS Flow Identifier | M | | 9.2.3.10 | |
| >>DL Forwarding | O | | 9.2.3.34 | |
| Source DRB to QoS Flow Mapping List | O | | DRB to QoS Flow Mapping List 9.2.1.15 | |

The last serving gNB gives the cause indicating whether to make anchor relocation or not. The cause may include at least one of: UE service type, timer for small data transmission, DL data arriving, load status, and UE mobility. The retrieve UE context response message with cause value as illustrated above can be applied in embodiments of FIG. 8.

The last serving gNB may make a decision to do anchor relocation during three phases, i.e., 1) after receiving UL data transmission request and UE context retrieve request; 2) during the data forwarding procedure; and 3) at the end of data transmission. Hence, an independent last serving gNB relocation message over Xn as illustrated above can be introduced.

The last serving gNB may make a decision based on the UE context information that it stored by itself. For example, the relocation information may be stored in UE context, and may be associated with UE service type. The service type can be indicated to the second base station, e.g., the last serving gNB by the first base station, e.g., gNB.

Figure 9:
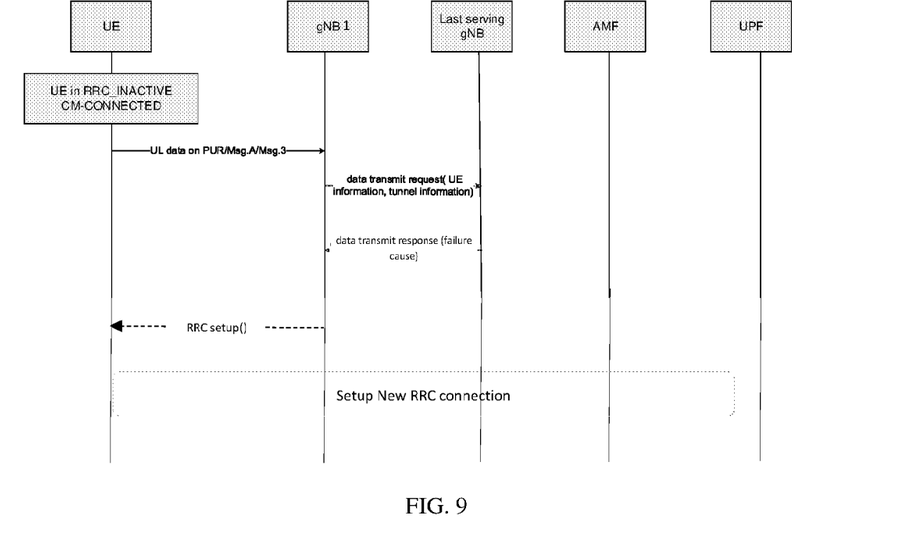
FIG. 9 illustrates an exemplary procedure of a method for data transmission in a scenario of option 3 in accordance with some yet other embodiments of the present application.

FIG. 9 illustrates an exemplary procedure of a method for data transmission in a scenario of option 3 according to some embodiments of the present application, wherein, the second base station, e.g., the last serving gNB does not agree on small data forwarding, and does not agree on anchor gNB relocation either.

In embodiments shown in FIG. 9, the data transmission response to the first base station based on the determining, e.g., a data transmit response may include a failure message with failure cause. The retrieve UE context failure with the cause can be applied. The failure message may include an indication to indicate the UE to trigger the (small) data transmission in inactive mode next time.

As stated above, in some embodiments of the present application, the UE reports assistant information on small data transmission or last serving gNB relocation information to the first base station, e.g., gNB1. gNB1 will transfer the information indicating small data transmission procedure or the anchor relocation information based on assistant information to the last serving gNB. Then, the last serving gNB can make decision based on the assistant information from gNB1.

The information indicating small data transmission procedure could comprises at least one of: small data information, UE service type information, small data size information, release assistant information, and significant bit to indicate this requirement.

In some embodiments the present application, the last serving base station may store the assistant information from UE(s), AMF(s) and/or other base stations. The last serving base station may make a decision based on the UE context information stored by itself.

Figure 10:
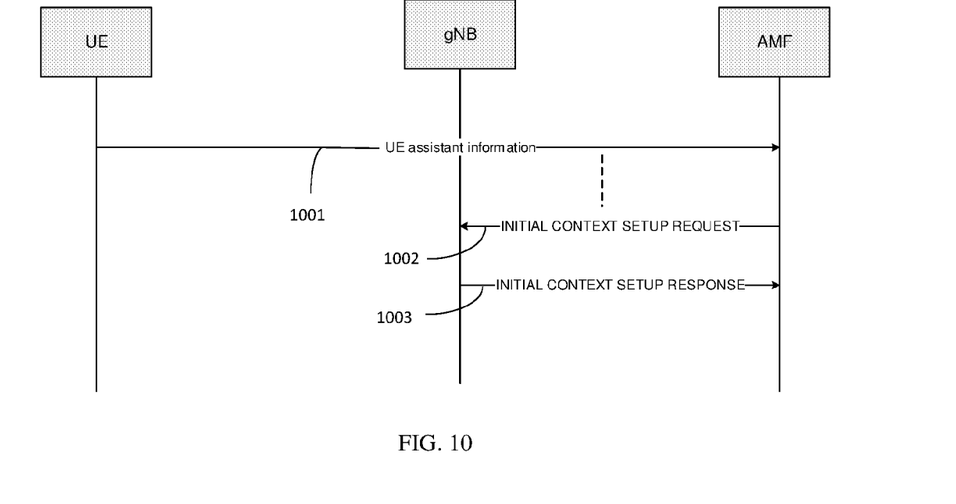
FIG. 10 illustrates a flow chart of a method for transmission of assistant information in accordance with some embodiments of the present application.

FIG. 10 illustrates a flow chart of a method for transmission of assistant information according to some embodiments of the present application.

As shown in FIG. 10, in step 1001, the UE reports assistant information to a CN node, e.g., an AMF for small data transmission. The information may be stored as UE context in the AMF. The information may be sent to the AMF by a NAS procedure or be sent to a base station, e.g., a gNB, firstly, and then be transferred to the AMF by the gNB. The base station can be any base station that serves the UE, e.g., the last serving base station. The assistant information for small data transmission reported by the UE may include the information as illustrated above, e.g., including at least one of: time information for an uplink data transmission procedure, number information of transmission block for uplink data transmission and associated transmission block size information, one or more shot of uplink data transmission, uplink data size in a time period, uplink data transmission with or without downlink data transmission, whether to support small data transmission, anchor relocation information, and release assistant information. The time information for the uplink data transmission procedure may include a time range or an averaged time duration for the uplink data transmission procedure. The number information of transmission block may include a number range of transmission block or an averaged number of transmission block.

In step 1002, when a PDU connection is established, the AMF can send above assistant information to the gNB, e.g., the last serving gNB. The information can be included in initial context setup request information as shown in FIG. 10. In step 1003, the gNB sends initial context setup response to the AMF.

Figure 11:
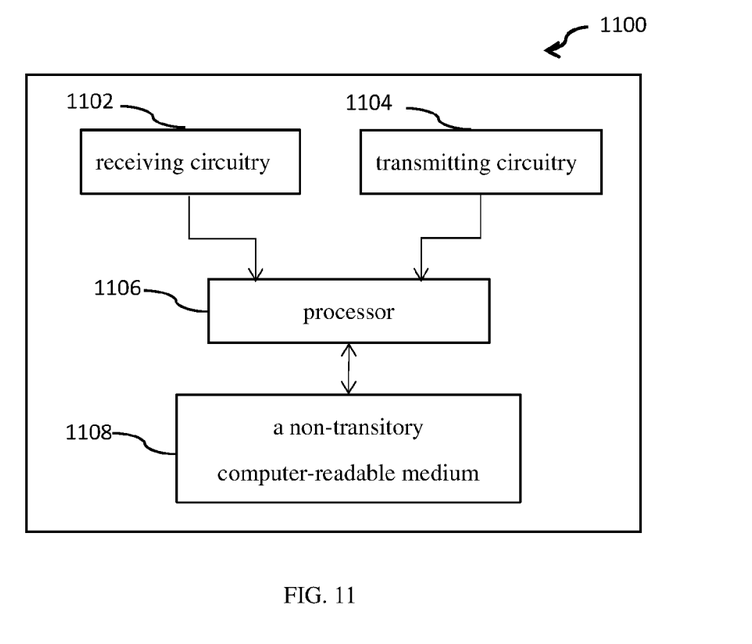
FIG. 11 illustrates a block diagram of an exemplary apparatus in accordance with some embodiments of the present application.

FIG. 11 illustrates a block diagram of an exemplary apparatus in accordance with some embodiments of the present application, which may perform the method illustrated in FIGS. 6-10 respectively in different embodiments. Referring to FIG. 11, the apparatus 1100 includes at least one receiving circuitry 1102, at least one transmitting circuitry 1104, at least one processor 1106, and at least one non-transitory computer-readable medium 1108. The processor 1106 is coupled to the non-transitory computer-readable medium 1108, the receiving circuitry 1102, and the transmitting circuitry 1104.

It is contemplated that some components are omitted in FIG. 11 for simplicity. In some embodiments, the receiving circuitry 1102 and the transmitting circuitry 1104 may be integrated into a single component (e.g., a transceiver).

In some embodiments, the non-transitory computer-readable medium 1108 may have stored thereon computerexecutable instructions to cause a processor to implement the operations with respect to UE(s) as described above.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

In some embodiments of the present application, the small data transmission could be extended to dedicated data transmission, or to data transmission. This means that present application could be applied for the data transmission for inactive UE or connected UE.

In some embodiments of the present application, the first gNB and the last serving gNB could be in the same RNA (RAN-based Notification Area).

In some embodiments of the present application, the data transmission refers to transmit the uplink data and or downlink data for UE in inactive mode. The data transmission refers to transmit the uplink data and or downlink data for UE in IDLE mode. The uplink data transmission means the UE transmit the data to network when UE is inactive mode and initiate the data transmission. The uplink data transmission means the UE transmit the data to network when UE is IDLE mode and initiate the data transmission. The initiating the data transmission may mean to initiate and transmit the data.

In some embodiments of the present application, the small data transmission refers to transmit the uplink data and or downlink data for UE in inactive mode. The small data transmission refers to transmit the uplink data and or downlink data for UE in IDLE mode. The uplink data transmission means the UE transmit the data to network when UE is inactive mode and initiate the data transmission. The uplink data transmission means the UE transmit the data to network when UE is IDLE mode and initiate the data transmission. The initiating the data transmission may mean to initiate and transmit the data. The data size in small data transmission could be not larger than the maximum TB size that will be applied in one transmission.

In some embodiment of the present application, it could also be applied to the case that data transmission is initiated by the network. For example, the paging is transmitted by the network, the UE initiate the procedure when UE is in inactive mode or IDLE mode. The initiating the procedure may mean to initiate and transmit the data in the procedure.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this application has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. An apparatus for wireless communication, comprising:
   at least one memory; and
   at least one processor coupled with the at least one memory and operable to cause the apparatus to:
      receive a data transmission request from a first base station, wherein the data transmission request indicates data transmission information on a data transmission and the apparatus is at least part of a second base station;
      determine whether to transmit the data transmission by the second base station or make an anchor relocation for the data transmission based on the data transmission information and assistant information associated with the data transmission, wherein the assistant information includes first assistant information from an access and mobility management function (AMF), the first assistant information includes time information for an uplink data transmission procedure, and the time information for the uplink data transmission procedure includes a time range or an averaged time duration for the uplink data transmission procedure; and
      transmit a data transmission response to the first base station based on the determining.

2. The apparatus of claim 1, wherein the assistant information comprises
   second assistant information from the first base station.

3. The apparatus of claim 2, wherein the first assistant information comprises at least one of:
   number information of transmission block for uplink data transmission and associated transmission block size information;
   one or more uplink data transmissions;
   uplink data size in a time period;
   uplink data transmission with or without downlink data transmission;
   whether to support small data transmission;
   anchor relocation information; or
   release assistant information.

4. The apparatus of claim 2, wherein the second assistant information comprises information indicating small data transmission procedure or information indicating anchor relocation.

5. The apparatus of claim 4, wherein the information indicating small data transmission procedure comprises as least one of:
    small data information;
    user equipment service type information for small data transmission;
    a service type for small data transmission;
    user equipment traffic information;
    significant bit to indicate requirement of the small data transmission; or
    release assistant information.

6. The apparatus of claim 4, wherein the information indicating anchor relocation comprises at least one of:
    one bit indicating whether the first base station requests the anchor relocation, or indicating whether the anchor relocation is acceptable or unacceptable for the first base station; or
    uplink data information.

7. The apparatus of claim 1, wherein the at least one processor is further configured to cause the apparatus to receive an anchor relocation request from the first base station.

8. The apparatus of claim 7, wherein the at least one processor is further configured to cause the apparatus to transmit an anchor relocation response message to the first base station.

9. The apparatus of claim 1, wherein the data transmission request comprises an Xn-C message or retrieve user equipment context request message.

10. The apparatus of claim 9, wherein the data transmission request comprises at least one of user equipment identifier, user equipment security information and uplink data forwarding request information.

11. The apparatus of claim 1, wherein the data transmission response comprises an Xn-C message or retrieve user equipment context response message.

12. The apparatus of claim 11, wherein the data transmission response comprises uplink data forwarding transport network layer (TNL) address information.

13. The apparatus of claim 11, wherein the data transmission response comprises at least one:
    user equipment service type;
    time for small data transmission;
    downlink data arriving;
    load status; and
    user equipment mobility.

14. An apparatus for wireless communication, comprising:
    at least one memory; and
    at least one processor coupled with the at least one memory and operable to cause the apparatus to:
        receive uplink data, wherein the apparatus is at least part of a first base station;
        transmit a data transmission request for a data transmission associated with the received uplink data to a second base station, wherein the data transmission is based on assistant information associated with the data transmission, the assistant information includes first assistant information from an access and mobility management function (AMF), the first assistant information includes time information for an uplink data transmission procedure, and the time information for the uplink data transmission procedure includes a time range or an averaged time duration for the uplink data transmission procedure; and
        receive a data transmission response indicating that the data transmission will be performed by the second base station or not, or an anchor relocation will be made or not.

15. The apparatus of claim 14, wherein the at least one processor is further configured to cause the apparatus to:
    send information indicating small data transmission procedure or information indicating anchor relocation.

16. The apparatus of claim 15, wherein the information indicating anchor relocation comprises at least one of:
    one bit indicating whether the first base station requests the anchor relocation, or indicating whether the anchor relocation is acceptable or unacceptable for the first base station; and
    uplink data information.

17. An apparatus for wireless communication, comprising:
    at least one memory; and
    at least one processor coupled with the at least one memory and operable to cause the apparatus to:
        report assistant information on a data transmission associated with uplink data from a user equipment to one of a core network over a non-access stratum (NAS) procedure and a base station on a random access channel (RACH) message or preconfigured uplink resource, wherein the data transmission is based on assistant information associated with the data transmission, the assistant information includes first assistant information from an access and mobility management function (AMF), the first assistant information includes time information for an uplink data transmission procedure, and the time information for the uplink data transmission procedure includes a time range or an averaged time duration for the uplink data transmission procedure.

18. The apparatus of claim 17, wherein the assistant information comprises at least one of:
    number information of transmission block for uplink data transmission and associated transmission block size information;
    one or more uplink data transmissions;
    uplink data size in a time period;
    uplink data transmission with or without downlink data transmission;
    whether to support small data transmission;
    anchor relocation information; and
    release assistant information.

19. A method performed by an apparatus, the method comprising:
    receive a data transmission request from a first base station, wherein the data transmission request indicates data transmission information on a data transmission;
    determine whether to transmit the data transmission by a second base station or make an anchor relocation for the data transmission based on the data transmission information and assistant information associated with the data transmission, wherein the assistant information includes first assistant information from an access and mobility management function (AMF), the first assistant information includes time information for an uplink data transmission procedure, and the time information for the uplink data transmission procedure includes a time range or an averaged time duration for the uplink data transmission procedure; and transmit a data transmission response to the first base station based on the determining.

20. The method of claim 19, wherein the assistant information comprises second assistant information from the first base station.

* * * * *